April 16, 1940.  C. F. SCHMIDT  2,197,714
APPARATUS FOR ASSEMBLING GLASS APPLICATOR RODS AND BOTTLE CAPS
Filed Nov. 2, 1936  8 Sheets-Sheet 1

INVENTOR.
CHARLES F. SCHMIDT
BY Rule & Hoge
ATTORNEYS.

April 16, 1940.  C. F. SCHMIDT  2,197,714
APPARATUS FOR ASSEMBLING GLASS APPLICATOR RODS AND BOTTLE CAPS
Filed Nov. 2, 1936  8 Sheets-Sheet 8

INVENTOR.
CHARLES F. SCHMIDT
BY Rule & Hoge
ATTORNEYS.

Patented Apr. 16, 1940

2,197,714

UNITED STATES PATENT OFFICE 2,197,714

APPARATUS FOR ASSEMBLING GLASS APPLICATOR RODS AND BOTTLE CAPS

Charles F. Schmidt, Toledo, Ohio, assignor to Owens-Illinois Glass Company, a corporation of Ohio Application November 2, 1936, Serial No. 108,694

13 Claims. (Cl. 49—1)

The present invention relates to apparatus for applying glass rods to bottle closures in the manufacture of applicator closures for pharmaceutical bottles of the type adapted to contain iodine, mercurochrome and other antiseptic solutions designed for external application.

The principal object of the invention is to provide a machine for applying glass rods to molded closures or caps which is fully automatic in its operation and which will receive the rods and the closures separately and operate to move the rods successively through a heating zone in which one end of each rod becomes heated and assumes a semi-plastic condition prior to being brought into alignment with a molded closure whereupon a suitable plunger mechanism forces the closure into engagement with the heated end of the rod in such a manner that the heated end enters a recess provided in the closure and effects an enlargement of the heated end of the rod in the recess to cause permanent union between the heated end of the rod and the closure.

Another object of the invention is to provide such an apparatus for applying applicator rods to closures in which the rods are individually brought into alignment with the closures and applied thereto and in which, should for any reason whatsoever a rod fail to be supplied for any particular closure, or should a closure fail to be supplied for any particular rod, the rod or closure whose counterpart is lacking will be ejected from the machine without damage for subsequent reuse.

Other objects and advantages of the invention, not at this time enumerated, will become readily apparent hereinafter.

In the accompanying drawings forming a part of this specification:

Fig. 8 is a top plan view of the apparatus;

Figure 1:
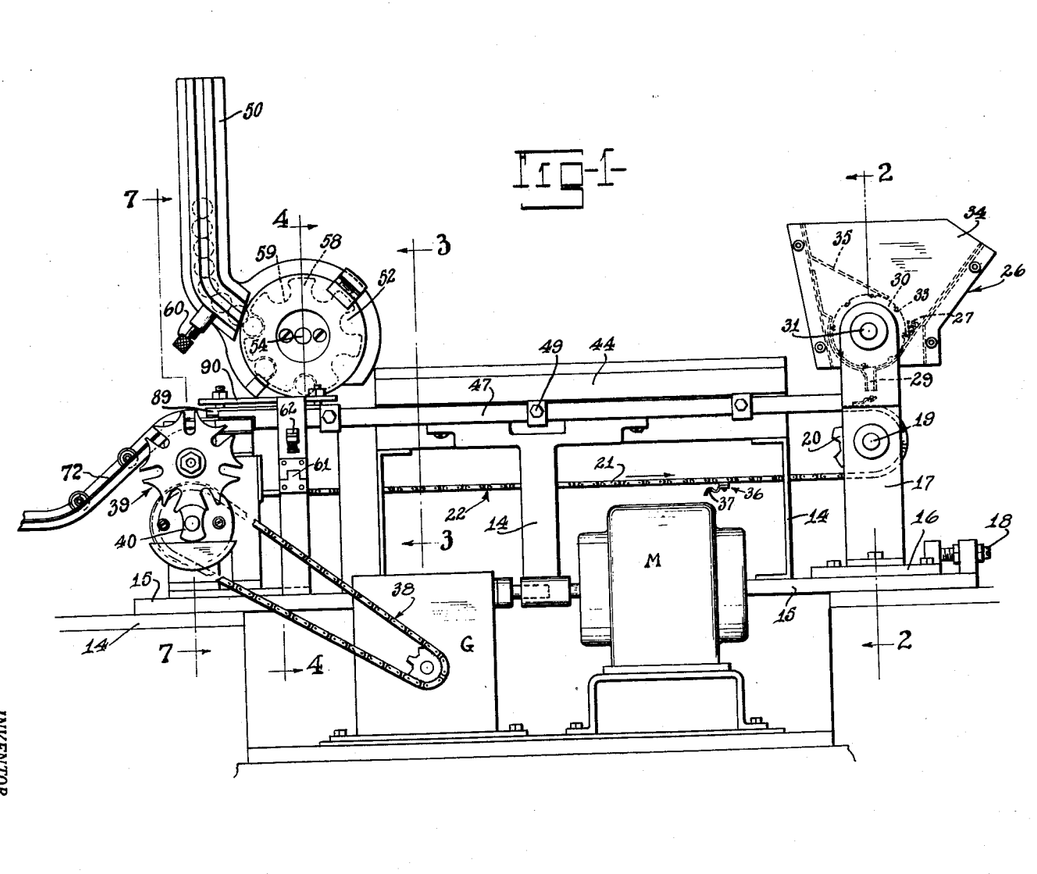
Fig. 1 is a side elevational view of an apparatus manufactured in accordance with the principles of the invention.

Referring now to Fig. 1, the apparatus involves in its general organization a supporting framework 14 including a horizontal table portion 15, upon which there is adjustably mounted at one end thereof a base plate 16. A pair of standards 17 are secured to the base plate 16 and project upwardly therefrom. The standards 17 are movable with the base plate longitudinally of the machine, adjustment of the latter being accomplished by means of an adjusting screw 18.

Rotatably journalled between the standards 17 medially of their ends is a horizontal conveyor shaft 19 having a conveyor sprocket 20 mounted thereon. The conveyor sprocket serves to support thereon one end of an endless conveyor chain 21 forming a part of an endless conveyor system 22 which extends longitudinally of the machine and which is substantially coextensive therewith. The other end of the conveyor chain 21 is supported upon a conveyor sprocket 22' (Fig. 7) which is mounted upon a transverse shaft 23 supported in bearings 24 carried by the framework of the machine.

Figures 12, 13:
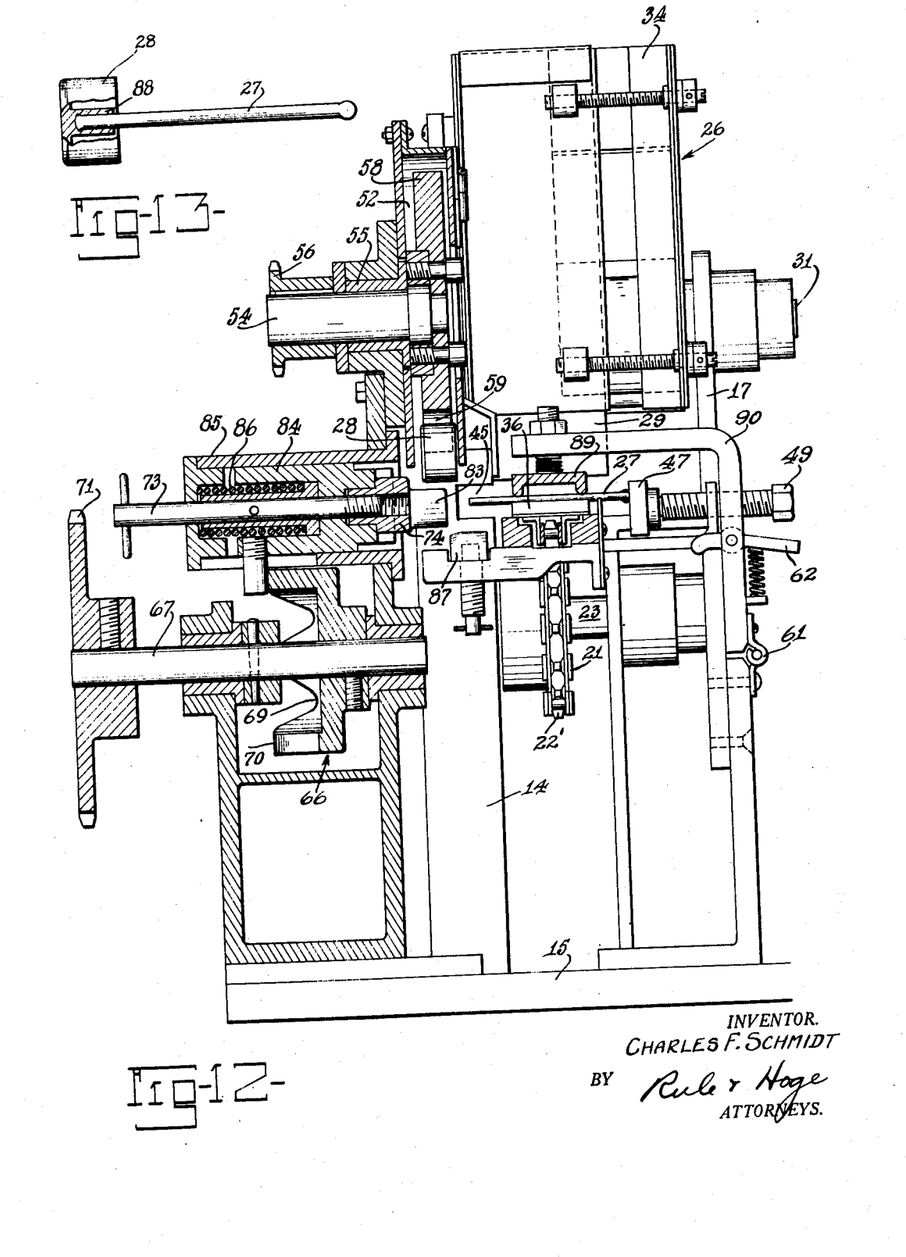
Fig. 12 is a sectional view similar to Fig. 4 showing the plunger mechanism in its retracted inoperative position.
Fig. 13 is a side elevational view of an assembled glass applicator rod and cap manufactured in accordance with the principles of the present invention.

Supported at the upper ends of the standards 17 by means of bolts 25 or the like, is a dispensing container or hopper 26 adapted to contain therein the glass rods 27 which are to be applied to the molded bottle caps 28 (Fig. 13). The lower end of the hopper 26 is provided with an opening 29 through which the rods 27 are individually dropped onto the conveyor 22 thereunder. As shown in Fig. 13, the outer ends of the applicator rods 27 as assembled with the closures 28 are slightly enlarged to facilitate application of an antiseptic solution to the skin of the user. It is essential, therefore, that, in placing the unattached rods in the hopper 26, the ends thereof to be heated and applied to the closures extend in the same direction.

Figure 2:
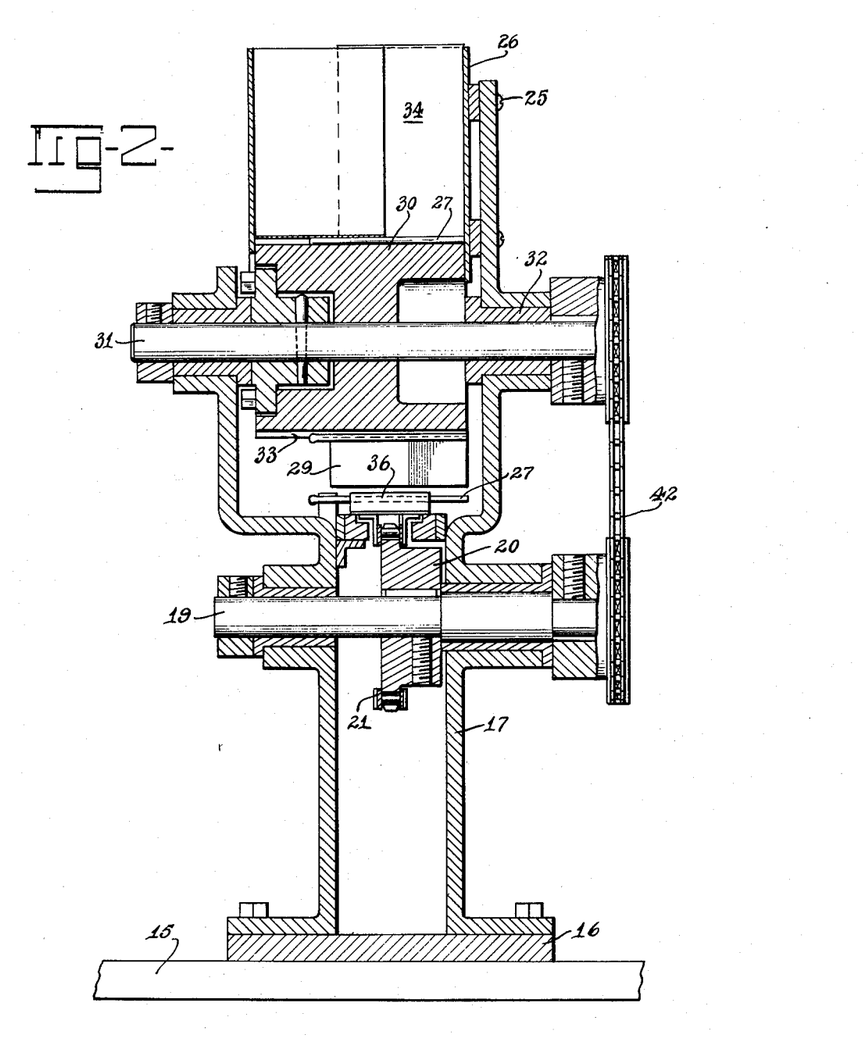
Fig. 2 is a sectional view taken substantially along the line 2—2 of Fig. 1.

In order to release the rods 27 one at a time, a dispensing wheel 30 mounted on a shaft 31 rotatably journalled in bearings 32 (Fig. 2) carried by the standards 17 near the top thereof, is disposed in the bottom of the hopper 26 above the opening 29. A plurality of uniformly spaced longitudinally extending grooves 33 are provided in the surface of the wheel 30, each groove being of a size sufficient to contain and support therein one of the glass rods 27. The hopper 26 is provided with a filling opening 34 through which the properly oriented rods are introduced into the hopper. Upon introduction into the hopper 26, the rods are by the action of gravity grouped in the bottom region thereof where they are individually picked up in the grooves 33 of the dispensing wheel 30 and carried in the direction of movement of the wheel as indicated by the arrow in Fig. 1. A baffle plate 35 extends from one wall of the hopper 26 and makes contact with the wheel 30, thus preventing more than a single rod from being carried by each groove 33 to the discharge opening 29.

Figure 7:
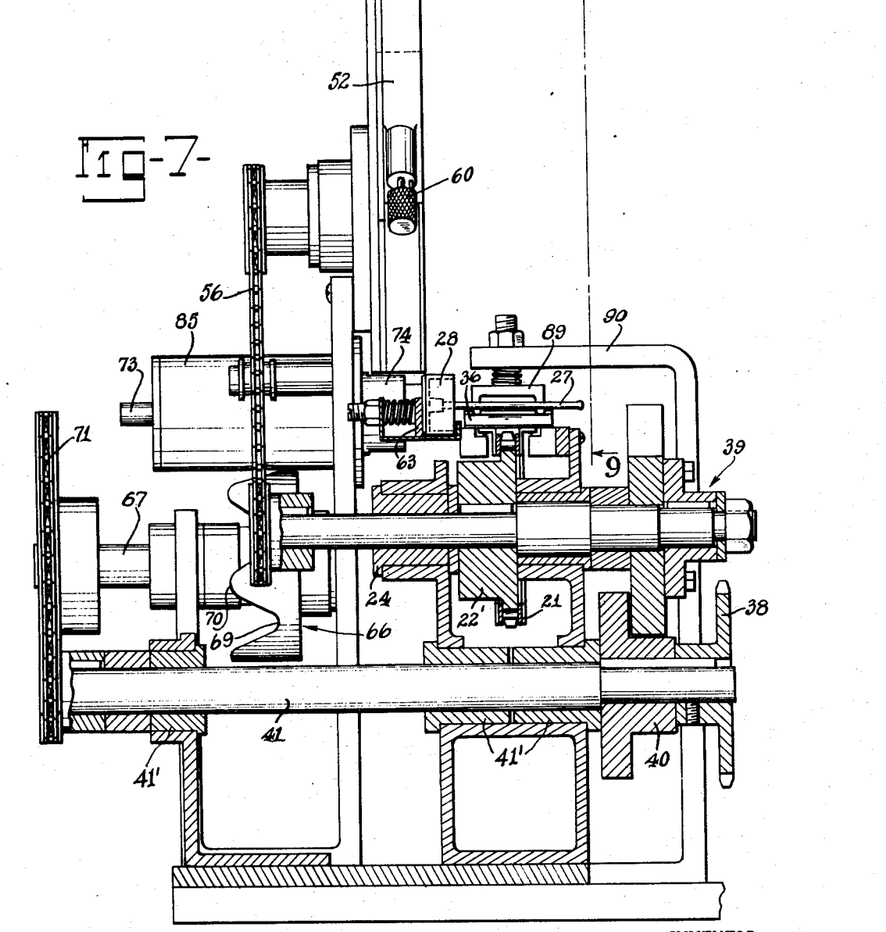
Fig. 7 is a sectional view taken substantially along the line 7—7 of Fig. 1.

The conveyor chain 21 has secured thereto at spaced points therealong a series of rod supports 36, each support being provided with a transversely extending shallow groove 37 in which the rods 27 are supported on the conveyor chain 21. The chain is adapted to be moved intermittently in the direction indicated by the arrow in Fig. 1 while the dispensing wheel 30 is intermittently moved in timed relationship to the movement of the conveyor chain 21 in such a manner that a rod is released from the hopper 26 at the precise moment when one of the supports 36 is in position beneath the opening 29 to receive the same. Toward this end, an electric motor M suitably supported in the framework 14 operates through a gear reduction device G and chain and sprocket mechanism 38 to drive a conventional type of Geneva gear assembly 39 which includes a Geneva stop element 40 mounted upon a shaft 41 rotatively journalled in bearings 41' supported on the framework 14. By means of the Geneva gear assembly 39, intermittent rotary motion is imparted to the conveyor driving shaft 23 (Fig. 7). The shaft 31 (Fig. 2) upon which the rod dispensing wheel 30 is mounted, is driven in timed relation to the movement of the conveyor chain 21 by means of a chain and sprocket mechanism 42 connecting these shafts.

Figure 3:
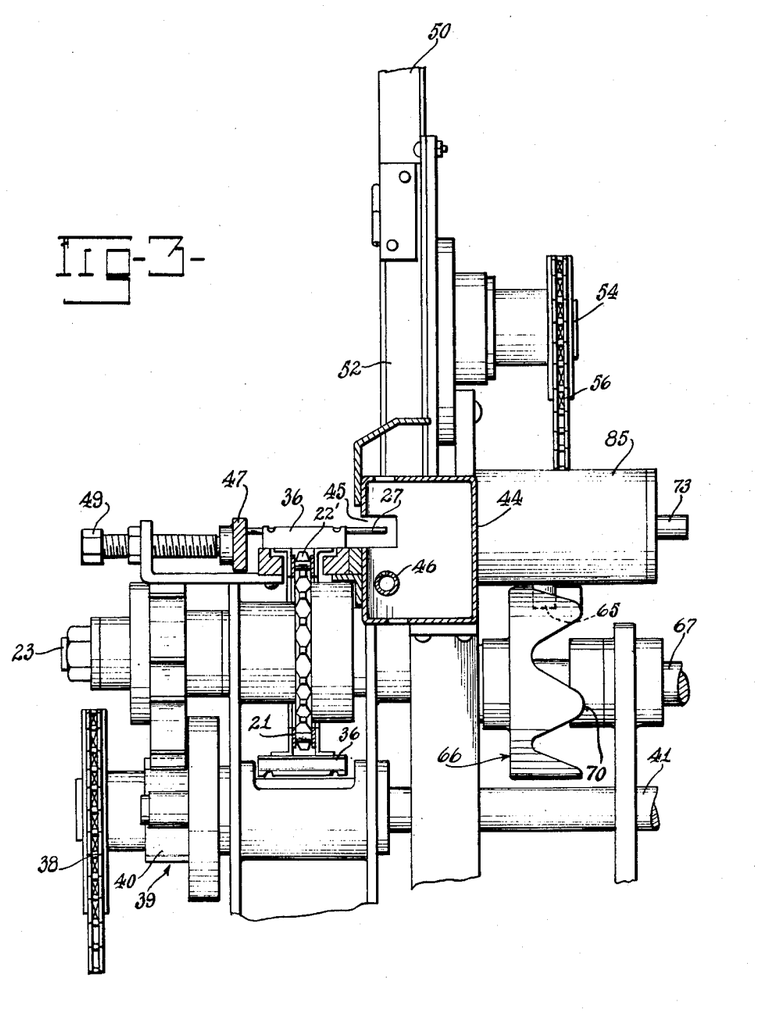
Fig. 3 is a sectional view taken substantially along the line 3—3 of Fig. 1.

Supported from the framework 14 above the conveyor chain 21 and medially of the ends of the conveyor is an elongated heating oven 44 by means of which the ends of the glass rods 27 are heated to a semi-plastic state preparatory to being applied to the bottle caps. Referring now to Figs. 3 and 8, it will be seen that the rods 27 are longer than the grooves 37 in which they are supported on the supports 36 and thus the ends of the rods to be heated project laterally over the edges of the supports 36 in such a manner that they project into a slot 45 provided in the heating oven 44 directly over the flame that issues from an elongated burner 46 disposed coextensively within the oven 44. The ends of the rods 27 are aligned on the supports 36 by means of a longitudinally extending cam and pressure bar 47 which is substantially coextensive with the conveyor. The end of the cam and pressure bar 47 in the vicinity of the rod hopper 26 is flared gradually outwardly as at 48 (Fig. 8) and the ends of the rods 27, in moving longitudinally of the apparatus on the conveyor supports 36, engage the cam and pressure bar 47 and are aligned thereby. The cam and pressure bar 47 is adjustable toward and away from the supports 36 to accommodate glass rods of different length and accordingly a series of adjusting screws 49 are provided for this purpose of adjustment.

Figure 9:
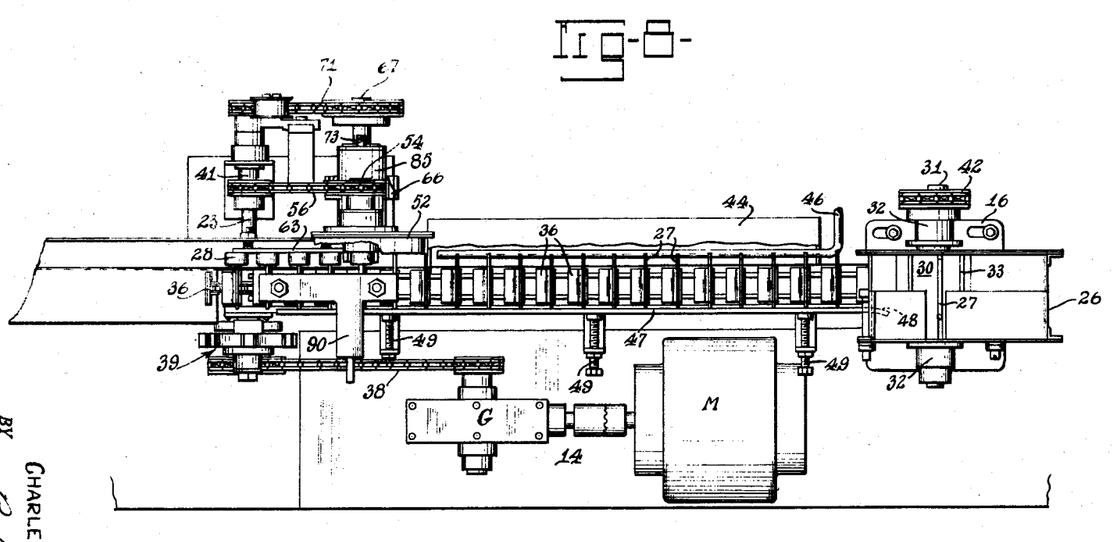
Fig. 9 is an enlarged fragmentary sectional view taken substantially along the line 9—9 of Fig. 7.
Figure 10:
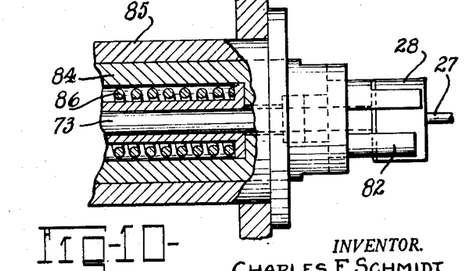
Fig. 10 is an enlarged fragmentary sectional view taken longitudinally through a plunger mechanism employed in connection with the present invention.
Figure 11:
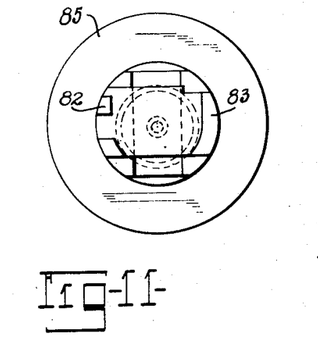
Fig. 11 is an end view of the plunger mechanism shown in Fig. 10.

Referring now to Figs. 1 and 9, a dispensing chute 50 adapted to contain the molded bottle caps 28 is supported from the framework 14 above the conveyor chain 21 near the discharge end of the oven 44. The chute 50 communicates at its lower end with the interior of a substantially cylindrical chamber 52, the width of which is slightly greater than the width of the bottle caps 28. The lowermost portion of the chamber 52 is provided with a discharge opening 53 for the caps.

Extending centrally and transversely across the chamber 52 is a shaft 54 (Figs. 4 and 9) supported in bearings 55. The shaft 54 is connected by means of a chain and sprocket mechanism 56 (Fig. 7) to the shaft 23 by means of which the conveyor chain 21 is intermittently driven. Thus, movement of the shaft 54 is synchronized with the movement of the conveyor chain. Disposed within the chamber 52 and keyed as at 57 (Fig. 9) to the shaft 54 is a cap dispensing wheel 58. A plurality of uniformly spaced transversely extending arcuate grooves 59 are provided in the periphery of the wheel 58 and each groove is adapted to receive therein an individual cap 28 from the chute 50 as the groove passes the lower end of the same. The caps 28 are thus transferred from the chute 50 one at a time and are discharged from the chamber 52 through the opening 53. The supply of caps 28 delivered to the dispensing wheel 58 for discharge through the opening 53 may be cut off by means of a spring pressed finger operated slide 60 which extends through the wall of the chute 50 near the bottom thereof and which may be advanced or retracted at will.

Figures 4, 5, 6:
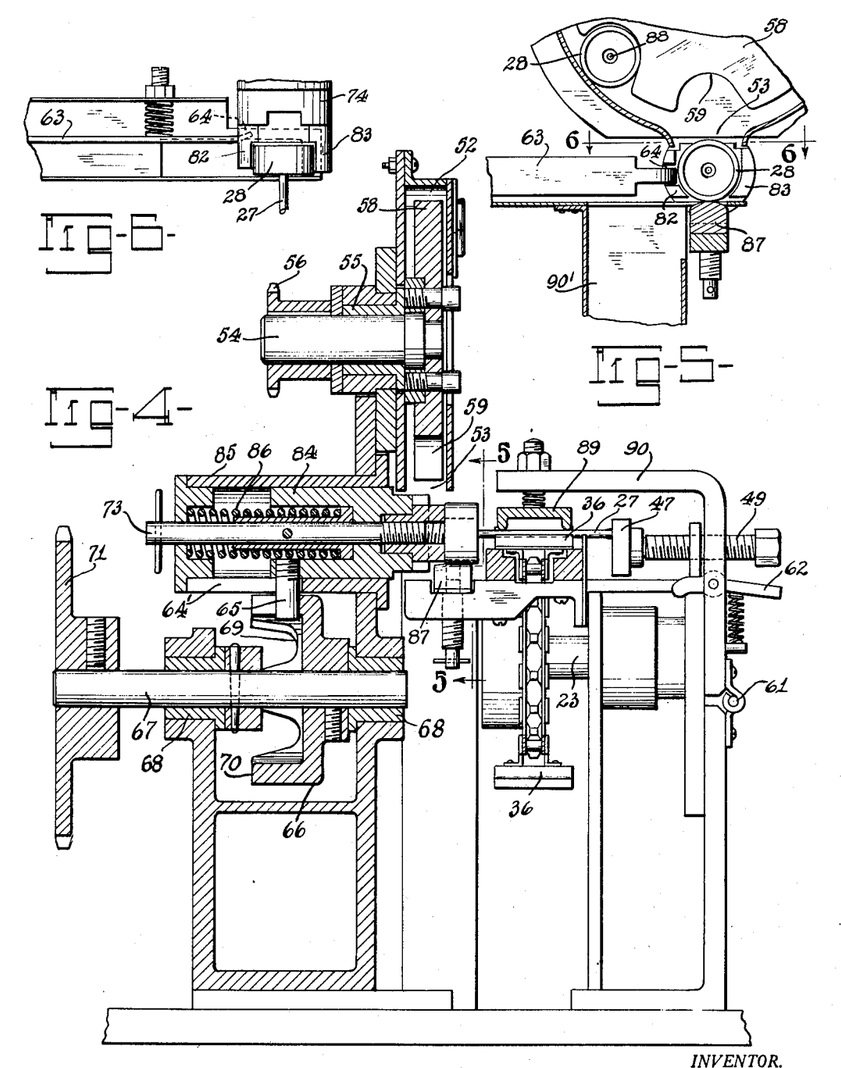
Fig. 4 is a sectional view taken substantially along the line 4—4 of Fig. 1.
Fig. 5 is a sectional view taken substantially along the line 5—5 of Fig. 4.
Fig. 6 is a sectional view taken substantially along the line 6—6 of Fig. 5.

Referring now to Fig. 4, it will be seen that the heated ends of the rods 27, after passing through the heating oven 44 are successively brought into alignment with respective caps 28 which have been discharged from the opening 53 for the purpose of application to the rods. Each cap 28, upon being released from the chamber 52, is deposited between and retained by a pair of spaced retaining members 82 and 83 (Fig. 5) carried by the inner end of a cap applying plunger 84.

The plunger 84 is mounted for reciprocation within a cylinder or casing 85 positioned beneath the chamber 52, and is normally urged by means of a coil spring 86 to its extended cap applying position. When the plunger 84 moves from its retracted position within the casing 85 as shown in Fig. 12, to its cap applying position as shown in Fig. 4, the cap 28 which is in position between the retaining members 82 and 83 is engaged by the extreme end of the plunger 84 and is moved toward the heated end of the rod 27 and in so moving, the cap rides upwardly on a vertically adjustable support 87 by means of which the cap is brought into alignment with the heated end of the rod. The heated end of the rod 27 enters a recess 88 provided in the cap, thus effecting enlargement of the heated end of the rod and a consequent permanent union between the applicator rod 27 and cap. During this application of the cap 28 to the rod 27, the cam and pressure bar 47 receives the end thrust of the rod and braces the same in such a manner that the required degree of pressure necessary to cause enlargement of the heated end thereof may be obtained. In order to maintain the rod firmly upon the support 36 during application of the cap 28, a spring pressed pressure bar 89, which is suspended from an overlying arm 90, bears downwardly against the rod and maintains the same in its aligned position within the groove 37 of the support 36. The arm 90 is hinged as at 61 to the framework 14 and is normally maintained in its overlying position as shown in Fig. 4 by means of a latch 62. By releasing the latch 62, the arm 90 together with the pressure bar 89 may be swung outwardly away from operative engagement with the rods 27.

The extent to which the plunger 84 may be projected from the casing 85 may be varied to accommodate the application of closures to rods of different length. Accordingly, a threaded regulating rod 73, one end of which projects from the casing 85 extends centrally through the casing and plunger 84. The other end of the rod 73 is threadedly received in an axial extension 74 at the forward end of the plunger. By turning the rod 73 in one direction or the other, the effective length of the plunger and the extent to which it projects from the casing 85 may be varied.

After a cap 28 has been applied to a rod 27 in the manner just described, the plunger 84 is retracted and, in order to prevent retraction of the assembled closure and rod, a friction finger 63 projects through a slot 64 formed in the retaining member 82 and engages the periphery of the cap 28 to prevent its retraction by the plunger 84 in case the pressure exerted by the pressure bar upon the rod 27 is insufficient for this purpose.

The mechanism for actuating the closure applying plunger 84 is best illustrated in Fig. 4. The casing 85 is provided with an axially extending slot 64' through which there projects a pin 65, the inner end of which is affixed to the plunger 84. The pin 65 cooperates with a notched drum cam 66 mounted upon a shaft 67 rotatably journalled in bearings 68 supported by the framework 14. The drum cam 66 is provided with a series of troughs 69 and crests 70 over which the pin 65 rides as the shaft 67 is rotated. The shaft 67 is connected by means of a chain and sprocket mechanism 71 (Fig. 7) to the continuously rotating shaft 41 which carries the Geneva stop 40 for intermittently actuating the Geneva mechanism 39. Thus it will be seen that as the pin 65 rides over the crests 70 and troughs 69 of the drum cam 66, the plunger 84 will be reciprocated in timed relation to the movement of the conveyor chain 21.

After each application of a cap 28 to a rod 27, the next indexing operation of the conveyor chain 21 moves the assembled applicator closure from its aligned position with the plunger 84 while simultaneously another cap and rod come into alignment with each other and with the plunger 84. As the assembled units reach the end of the conveyor 22, they are released by the pressure bar 89 and are deposited by the supports 36 on an incline 72 from whence they issue from the machine.

In the operation of the machine, should for any reason whatsoever, a glass applicator rod 27 fail to be supplied to any particular rod support 36, the corresponding closure intended for the missing rod, having no means of support on the conveyor chain 21 after the plunger 84 has been withdrawn, will fall or tumble from the adjustable support 87 into a chute 90' and, if desired, a basket, box or other receptacle may be placed beneath the chute 90' from which the unapplied closures may be reclaimed.

Modifications and variations may be resorted to within the spirit and scope of the appended claims.

I claim:

1. In a machine for applying glass applicator rods to molded bottle caps having axially extending central recesses formed therein, heating means establishing a zone of relatively high heat, an endless conveyor adapted to receive thereon a series of applicator rods and convey the same successively past said zone to heat one end of each rod, means for indexing said conveyor to move the same in step-by-step fashion, a dispensing receptacle for the caps, means synchronizing with the movement of said conveyor for successively discharging said caps from said receptacle, means for receiving the discharged caps and for approximately aligning the same axially with the heated ends of said rods on said conveyor, means synchronized with the movement of said conveyor for successively moving said aligned caps axially toward said heated ends, means engaging said rods for bracing the same against the resultant end thrust exerted by said caps, and means operable upon such axial movement of said caps for accurately aligning said caps with said heated ends whereby said heated ends enter the recesses provided in said caps to effect permanent union between said caps and rods.

2. In a machine for applying glass applicator rods to molded bottle caps having axially extending central recesses formed therein, heating means establishing a zone of relatively high heat, an endless conveyor adapted to receive thereon a series of applicator rods and convey the same successively past said zone to heat one end of each rod, means for indexing said conveyor to move the same in step-by-step fashion, a dispensing receptacle for the caps, means synchronized with the movement of said conveyor for successively discharging a cap from said receptacle, a plunger, means carried by said plunger for receiving the discharged cap and for approximately aligning the same axially with the heated end of a rod on said conveyor, means synchonized with the movement of said conveyor for moving said plunger and cap axially toward said heated end whereby said heated end enters the recess provided in said cap to effect permanent union between said cap and rod, and means engaging said rod for bracing the same against the resultant end thrust exerted by said cap.

3. In a machine for applying glass applicator rods to molded bottle caps having axially extending central recesses formed therein, heating means establishing a zone of relatively high heat, an endless conveyor adapted to receive thereon a series of applicator rods and convey the same successively past said zone to heat one end of each rod, means for indexing said conveyor to move the same in step-by-step fashion, a dispensing receptacle for the caps, means synchronized with the movement of said conveyor for successively discharging a cap from said receptacle, a plunger, means carried by said plunger for receiving the discharged cap and for approximately aligning the same axially with the heated end of a rod on said conveyor, means synchronized with the movement of said conveyor for moving said plunger and cap axially toward said heated end, means operable upon such axial movement of said plunger for accurately aligning said cap with said heated end whereby said heated end enters the recess provided in said cap to effect permanent union between said cap and rod, and means engaging said rod for bracing the same against the resultant end thrust exerted by said cap.

4. In a machine for applying glass applicator rods to molded bottle caps having axially extending central recesses formed therein, heating means establishing a zone of relatively high heat, an endless conveyor adapted to receive thereon a series of applicator rods and convey the same successively past said zone to heat one end of each rod, means for indexing said conveyor to move the same in step-by-step fashion, a dispensing receptacle for the caps, means synchronized with the movement of said conveyor for successively discharging a cap from said receptacle, a plunger, means carried by said plunger for receiving the discharged cap and for approximately aligning the same axially with the heated end of a rod on said conveyor, means synchronized with the movement of said conveyor for moving said plunger and cap axially toward said heated end, stationary cam means operable upon such axial movement of said plunger for accurately aligning said cap with said heated end whereby said heated end enters the recess provided in said cap to effect permanent union between said cap and rod, and means engaging said rod for bracing the same against the resultant end thrust exerted by said cap.

5. In a machine for applying glass applicator rods to molded bottle caps having axially extending central recesses formed therein, heating means establishing a zone of relatively high heat, a conveyor adapted to receive thereon a series of applicator rods and convey the same successively past said zone to heat one end of each rod, means for moving said conveyor, means synchronized with the movement of said conveyor for successively positioning the rods on said conveyor, a dispensing receptacle for the caps, means synchronized with the movement of said conveyor for successively discharging a cap from said receptacle, means for receiving the discharged cap and for approximately aligning the same axially with the heated end of a rod of said conveyor, means synchronized with the movement of said conveyor for moving said aligned cap axially toward said heated end, means operable upon such axial movement of said cap for accurately aligning said cap with said heated end whereby said heated end enters the recess provided in said cap to effect permanent union between said cap and rod, and means engaging said rod for bracing the same against the resultant end thrust exerted by said cap.

6. In a machine for applying glass applicator rods to molded bottle caps having axially extending central recesses formed therein, heating means establishing a zone of relatively high heat, a conveyor adapted to receive thereon a series of applicator rods and convey the same successively past said zone to heat one end of each rod, means for moving said conveyor, means synchronized with the movement of said conveyor for successively positioning the rods on said conveyor, a dispensing receptacle for the caps, means synchronized with the movement of said conveyor for successively discharging a cap from said receptacle, means for receiving the discharged cap and for approximately aligning the same axially with the heated end of a rod of said conveyor, means synchronized with the movement of said conveyor for moving said aligned cap axially toward said heated end, stationary cam means operable upon such axial movement of said cap for accurately aligning said cap with said heated end whereby said heated end enters the recess provided in said cap to effect permanent union between said cap and rod, and means engaging said rod for bracing the same against the resultant end thrust exerted by said cap.

7. In a machine for applying glass applicator rods to molded bottle caps having axially extending centrally disposed recesses formed therein, heating means establishing a zone of relatively high heat, a conveyor adapted to successively and loosely receive thereon a series of applicator rods and convey the same successively past said zone to an assembly station, means for moving said conveyor, a receptacle for the caps, means for successively discharging a cap from said receptacle, means for receiving the discharged cap and for aligning the same axially with the heated end of a rod on said conveyor at said assembly station, pressure means in the vicinity of said assembly station for firmly engaging said rod on the conveyor to maintain the same in such axial alignment, and means synchronized with the movement of said conveyor and operable at said assembly station for moving said cap toward said rod whereby said heated end of said rod enters the recess provided in said cap to effect permanent union between said rod and cap.

8. In a machine for applying glass applicator rods to recessed molded bottle caps, heating means establishing a zone of relatively high heat, a conveyor having a series of spaced parallel recesses formed therein, each recess being adapted to receive therein an applicator rod, pressure means for maintaining said rods in said recesses, said conveyor being adapted to convey said rods successively past said zone to heat one end of each rod, means for moving said conveyor, a receptacle for the caps, means for successively discharging a cap from said receptacle, means for receiving the discharged cap, means for bringing said cap within the receiving means into alignment with the heated end of said rod on said conveyor, and means synchronized with the movement of the conveyor for establishing relative axial movement between said receiving means and said rod to cause the heated end of said rod to enter the recess provided in said cap and effect permanent union between said cap and rod, said rod forming the sole support for said cap on the conveyor.

9. In a machine for applying glass applicator rods to recessed molded bottle caps, stationary heating means establishing a zone of relatively high heat, a conveyor having a series of spaced parallel recesses formed therein, each recess being adapted to receive thereon an applicator rod, pressure means for maintaining said rods in said recesses, said conveyor being adapted to convey said rods successively past said zone to heat one end of each rod, means for moving said conveyor, a receptacle for the caps, means for successively discharging a cap from said receptacle, means for receiving the discharged cap, means for bringing said cap within the receiving means into juxtaposition with the heated end of a rod on the conveyor in such a manner that the discharged cap is brought into alignment with the heated end of a rod on said conveyor, and means synchronized with the movement of the conveyor for establishing relative axial movement between said receiving means and said rod whereby the heated end of the rod will enter the recess provided in said cap.

10. In a machine for applying glass applicator rods to molded bottle caps having axially extending central recesses formed therein, heating means establishing a zone of relatively high heat, a conveyor adapted to receive a series of applicator rods thereon and move the same past said zone to heat one end of each rod, means for moving said conveyor, a receptacle for the bottle caps, means for successively discharging a cap from said receptacle, means for receiving the discharged cap, means for guiding said cap within the receiving means into juxtaposition with the heated end of a rod in such a manner that the discharged cap carried thereby is brought into alignment with the heated end of said rod on said conveyor, means for moving said receiving means axially toward said rod to cause the heated end of said rod to enter the recess provided in said cap and effect permanent union between said cap and rod, and means engaging the rod for bracing the same against the resultant end thrust exerted by said cap.

11. In a machine for applying glass applicator rods to molded bottle caps having axially extending central recesses formed therein, stationary heating means establishing a zone of relatively high heat, an endless conveyor adapted to receive thereon a series of applicator rods and convey the same successively past said zone to heat one end of each rod, means for indexing said conveyor to move the same in step-by-step fashion, a dispensing receptacle for the caps, means synchronized with the movement of said conveyor for successively discharging the caps from said receptacle, stationary means for receiving the discharged caps successively and for approximately aligning the same axially with the heated end of a rod on said conveyor, means synchronized with the movement of said conveyor for moving said aligned caps axially toward said heated end whereby said end enters the recess provided in said cap to effect permanent union between said cap and rod, and means engaging said rods for bracing the same against the resultant end thrust exerted by said caps.

12. In a machine for applying glass applicator rods to molded bottle caps having axially extending central recesses formed therein, stationary heating means establishing a zone of relatively high heat, a conveyor adapted to receive thereon a series of applicator rods in a recumbent position and convey the same in such position successively past said zone to heat one end of each rod, means for moving said conveyor, means synchronized with the movement of said conveyor for successively positioning the rods on said conveyor in a recumbent position, a dispensing receptacle for the caps, means synchronized with the movement of said conveyor for successively discharging a cap from said receptacle, stationary means positioned at the end of said heating zone for receiving the discharged cap successively and for approximately aligning the same axially with the heated end of successive rods on said conveyor, means synchronized with the movement of said conveyor for moving said aligned caps axially and horizontally toward said heated ends of the rods whereby said heated ends enter the recesses provided in said caps to effect permanent union between said caps and rods, and means engaging said rods for bracing the same against the resultant end thrust exerted by said caps.

13. In a machine for applying glass applicator rods to molded bottle caps having axially extending centrally disposed recesses formed therein, stationary heating means establishing a zone of relatively high heat, a conveyor adapted to successively receive thereon a series of applicator rods in a recumbent position and convey the same in such position successively past said zone to an assembly station, means for moving said conveyor, a receptacle for the caps, means for successively discharging a cap from said receptacle, stationary means for receiving the discharged caps successively and for aligning the same axially with the heated end of successive rods on said conveyor at said assembly station, means synchronized with the movement of said conveyor and operable at said assembly station for establishing relative axial movement in a horizontal plane between said caps and rods whereby the heated ends of said rods enter the recesses provided in said caps to effect permanent union between said rods and caps.

CHARLES F. SCHMIDT.